US009197023B2

(12) United States Patent
Bar-Niv et al.

(10) Patent No.: US 9,197,023 B2
(45) **Date of Patent: *Nov. 24, 2015**

(54) APPARATUS FOR ENABLING SIMULTANEOUS CONTENT STREAMING AND POWER CHARGING OF HANDHELD DEVICES

(75) Inventors: Amir Bar-Niv, Sunnyvale, CA (US); Ziv Kabiry, Kfar Saba (IL); Yaron Slezak, Ra'anana (IL)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/312,457

(22) Filed: Dec. 6, 2011

(65) Prior Publication Data

US 2012/0077384 A1 Mar. 29, 2012

Related U.S. Application Data

(63) Continuation-in-part of application No. 12/558,673, filed on Sep. 14, 2009.

(60) Provisional application No. 61/425,546, filed on Dec. 21, 2010, provisional application No. 61/448,489, filed on Mar. 2, 2011.

(51) Int. Cl.

*G06F 3/00* (2006.01)
*H01R 27/02* (2006.01)
*H01R 27/00* (2006.01)
*G09G 5/00* (2006.01)

(52) U.S. Cl.

CPC ................ *H01R 27/02* (2013.01); *G09G 5/006* (2013.01); *H01R 27/00* (2013.01); *G09G 2330/021* (2013.01); *G09G 2370/10* (2013.01); *G09G 2370/12* (2013.01)

(58) Field of Classification Search

None

See application file for complete search history.

(56) References Cited

U.S. PATENT DOCUMENTS

| | | | | |
|---|---|---|---|---|
| 7,572,143 | B2 * | 8/2009 | Harris et al. | 439/502 |
| 7,611,367 | B2 * | 11/2009 | Lee | 439/218 |
| 7,677,925 | B2 | 3/2010 | Chuang | |
| 7,788,412 | B2 | 8/2010 | Guo | |

(Continued)

OTHER PUBLICATIONS

United States Office Action of U.S. Appl. No. 13/852,559 dated May 22, 2014.

(Continued)

*Primary Examiner* — Elias Mamo

(74) *Attorney, Agent, or Firm* — Pearl Cohen Zedek Latzer Baratz LLP

(57) ABSTRACT

An apparatus for enabling simultaneous multimedia content streaming and power charging of handheld devices, comprises a universal connector installed in a first device and enables connectivity of at least one multimedia display interface and at least one data interface with a second device, the first device is connected to the second device using a charging-streaming cable having, at one end, a first connector compliant with the universal connector, and at the other end, a second connector compliant with a multimedia display interface and a third connector compliant with a data interface of the second device, wherein streaming of the multimedia content is from the universal connector in the first device to the second connector in the second device and power charging of the first device is through the third connector of the second device; and a detector for determining a type of the multimedia display interface of the second device.

22 Claims, 18 Drawing Sheets

(56) References Cited

U.S. PATENT DOCUMENTS

| | | | | |
|---|---|---|---|---|
| 7,835,382 | B2 | 11/2010 | Lida | |
| 7,918,689 | B2 * | 4/2011 | Sloey et al. | 439/607.01 |
| 8,200,855 | B2 | 6/2012 | Goodart | |
| 8,242,803 | B2 | 8/2012 | Wu | |
| 2002/0038432 | A1 * | 3/2002 | Hsu | 713/300 |
| 2008/0084834 | A1 * | 4/2008 | Stanek | 370/284 |
| 2008/0201756 | A1 | 8/2008 | Shakiba et al. | |
| 2008/0205519 | A1 * | 8/2008 | Goodart et al. | 375/240.12 |
| 2008/0298504 | A1 | 12/2008 | Lee | |
| 2009/0074040 | A1 | 3/2009 | Lida | |
| 2009/0115911 | A1 | 5/2009 | Lida et al. | |
| 2009/0116547 | A1 | 5/2009 | Lida et al. | |
| 2009/0116548 | A1 | 5/2009 | Lida et al. | |
| 2009/0116583 | A1 | 5/2009 | Lida et al. | |
| 2009/0142969 | A1 * | 6/2009 | Chuang | 439/709 |
| 2009/0147864 | A1 | 6/2009 | Lida et al. | |
| 2009/0177901 | A1 * | 7/2009 | Chen et al. | 713/310 |
| 2009/0179883 | A1 | 7/2009 | Goodart | |
| 2009/0231485 | A1 | 9/2009 | Steinke | |
| 2009/0300243 | A1 | 12/2009 | Chao | |
| 2010/0079475 | A1 | 4/2010 | Whitby | |
| 2010/0128182 | A1 | 5/2010 | Ichimura | |
| 2010/0268860 | A1 | 10/2010 | Nikazm | |
| 2010/0328540 | A1 | 12/2010 | Wu | |
| 2011/0093623 | A1 | 4/2011 | Chen | |
| 2011/0167176 | A1 | 7/2011 | Yew | |
| 2011/0294359 | A1 | 12/2011 | Cho et al. | |
| 2012/0076296 | A1 | 3/2012 | Graunke | |
| 2012/0196475 | A1 * | 8/2012 | Lin | 439/505 |
| 2012/0320546 | A1 * | 12/2012 | Wu | 361/755 |
| 2013/0018624 | A1 | 1/2013 | Bhatnagar et al. | |
| 2013/0090019 | A1 | 4/2013 | Su et al. | |

OTHER PUBLICATIONS

United States Office Action of U.S. Appl. No. 13/312,514 dated May 8, 2013.

United States Final Office Action of U.S. Appl. No. 13/312,514 dated Jan. 2, 2014.

United States Office Action of U.S. Appl. No. 12/558,673 dated Jun. 22, 2012.

United States Final Office Action of U.S. Appl. No. 12/558,673 dated Feb. 21, 2013.

United States Office Action of U.S. Appl. No. 12/558,673 dated Jul. 25, 2013.

United States Final Office Action of U.S. Appl. No. 12/558,673 dated Apr. 25, 2014.

Office Action issued for U.S. Appl. No. 13/852,559, dated Sep. 30, 2014.

* cited by examiner

APPARATUS FOR ENABLING SIMULTANEOUS CONTENT STREAMING AND POWER CHARGING OF HANDHELD DEVICES

CROSS REFERENCE TO RELATED APPLICATIONS

This application claims priority from U.S. provisional patent application No. 61/425,546, filed on Dec. 21, 2010 and U.S. provisional application No. 61/448,489 filed Mar. 2, 2011. This application is also a continuation-in-part of Ser. No. 12/558,673 filed Sep. 14, 2009. The above-referenced applications are hereby included by reference for all that they contain.

TECHNICAL FIELD

This invention generally relates to the connectivity of handheld devices and electronic display devices.

BACKGROUND OF THE INVENTION

The high-definition multimedia interface (HDMI) is a compact audio/video connector interface for transmitting uncompressed digital streams. The HDMI connects a digital multimedia (or audio/video) source (e.g., a set-top box, a DVD player, a personal computer, a video game console, etc.) to a compatible digital sink, such as a digital television. The HDMI is fully described in the "HDMI Specification", version 1.4a published on Mar. 4, 2010, incorporated herein by reference in its entirety merely for the useful understanding of the background of the invention.

A HDMI cable is a transport medium including three transition minimized differential signaling (TMDS®) channels utilized to transfer video, audio, and auxiliary data encapsulated in TDMS characters; the transmission is synchronized using a high-frequency clock signal running over a clock channel. The TDMS and clock channels are differential pairs. A HDMI cable also includes the following channels: a display data channel (DDC_SCL and DDC_SDA), a consumer electronics control (CEC), and a hot-plug detect (HPD) signal which originates at the sink. The HDMI interface is implemented using a HDMI cable and connectors, each of which includes 19 pins. A source and a sink connector have the same configuration. Table 1 lists the pins in a type A HDMI connector (either a source or sink).

TABLE 1

| Pin Number | HDMI Signal |
|---|---|
| 1. | TMDS_Data2+ |
| 2. | Shield |
| 3. | TMDS_Data2− |
| 4. | TMDS_Data1+ |
| 5. | Shield |
| 6. | TMDS_Data1− |
| 7. | TMDS_Data0+ |
| 8. | Shield |
| 9. | TMDS_Data0− |
| 10. | TMDS_Clk+ |
| 11. | Shield |
| 12. | TMDS_Clk− |
| 13. | CEC |
| 14. | Utility/HEAC+ |
| 15. | SCL |
| 16. | SDA |
| 17. | DDC/CEC/Ground |
| 18. | +5V |
| 19. | HPD/HEAC− |

DisplayPort™ is a standard that defines a digital display interface of a new digital audio/video interconnect. The DisplayPort is intended to be used primarily between a computer and its display monitor, or a computer and a home-theater system. The DisplayPort standard is fully described in the "DisplayPort Specification" version 1.2, published on Jan. 5, 2010, by the Video Electronics Standards Association (VESA), incorporated herein by reference in its entirety merely for the useful understanding of the background of the invention.

Transport channels of a DisplayPort interface include a main link, an auxiliary channel (AUX), and a hot plug detect (HPD). The main link is a unidirectional channel that allows data transfers over up to 4 lanes that carry clock signals in addition to the video/audio streams. Each lane is an AC-coupled differential pair. The auxiliary channel is a bi-directional half-duplex channel that carries control and management information and the HPD channel is used by a sink device to interrupt a source device when a plug is connected or disconnected. The DisplayPort interface is facilitated using a proprietary cable and connectors, each of which includes 20 pins. The DisplayPort cable is a cross cable, i.e., each of the source and sink connectors has a different configuration. Table 2 lists the pins and their signals of source and sink DisplayPort connectors.

TABLE 2

| Pin Number | DisplayPort Source | DisplayPort Sink |
|---|---|---|
| 1. | ML_lane0P | ML_lane3N |
| 2. | GND | GND |
| 3. | ML_lane0N | ML_lane3P |
| 4. | ML_lane1P | ML_lane2N |
| 5. | GND | GND |
| 6. | ML_lane1N | ML_lane2P |
| 7. | ML_lane2P | ML_lane1N |
| 8. | GND | GND |
| 9. | ML_lane2N | ML_lane1P |
| 10. | ML_lane3P | ML_lane0N |
| 11. | GND | GND |
| 12. | ML_lane3N | ML_lane0P |
| 13. | Config1 | Config1 |
| 14. | Config2 | Config2 |
| 15. | AUX_CHP | AUX_CHP |
| 16. | GND | GND |
| 17. | AUX_CHN | AUX_CHN |
| 18. | HPD | HPD |
| 19. | Return | Return |
| 20. | AUX_PWR | AUX_PWR |

Digital Interactive Interface for Video & Audio (DiiVA™) is a standard that supports an interface for interactive consumer electronics and home networking. The DiiVA combines a reliable high-speed, bi-directional data channel in addition to an uncompressed video and audio channel over a single interface. The DiiVA interface allows users to connect, configure, and control various home consumer electronic devices (e.g., Blueray player, a game console, etc.) from their Digital TVs. The DiiVA is primarily intended to be used for connectivity of consumer electronic devices in the home. The DiiVA standard is fully described in the "DiiVA Specification Release Candidate", version 1.1 published on Oct. 5, 2010, by the China Video Industry Association, incorporated herein by reference in its entirety merely for the useful understanding of the background of the invention.

Transport channels of a DiiVA interface include a main link and a hybrid link. The main link is a unidirectional channel that allows data transfers over 3 lanes that carry clock signals in addition to the video streams. Each lane is an AC-coupled differential pair. The hybrid channel is a bi-directional high speed channel that carries an audio packet, and a control and data packet, such as Ethernet and USB, over both the video and hybrid channels. DiiVA includes a Power over DiiVA (PoD) mechanism that enables a device-to-device charging power. The DiiVA interface is facilitated using a standard twisted pair cable, such as a CAT6, CAT 6A and CAT 7 and DiiVA specific connectors. Each DiiVA connector includes 13 pins. A source and sink connector have the same configuration. Table 3 lists pins in a type A DiiVA connector (either a source or sink).

TABLE 3

| Pin Number | DiiVA Source |
|---|---|
| 1. | GND |
| 2. | VL2+ |
| 3. | VL2− |
| 4. | GND |
| 5. | VL1+ |
| 6. | VL1_ |
| 7. | GND |
| 8. | VL0+ |
| 9. | VL0− |
| 10. | GND |
| 11. | GND |
| 12. | HL+ |
| 13. | HL− |

The Universal Serial Bus (USB) standard was designed to establish communication between devices and a host controller of a PC. The USB can connect computer peripherals, such as mice, keyboards, digital cameras, printers, personal media players, flash drives, network adapters, external hard drives, and the like. The USB was designed for personal computers, but it has become commonplace on handheld devices, such as mobile phones, smartphones, PDAs, tablet computers, camcorders, and video game consoles. The USB can also serve as a power cord for charging such devices. For many types of handheld devices, the USB has become the only standard interface. The USB2 standard for Low speed (1.5 Mbps), Full Speed (12 Mbps) and High speed (480 Mbps) over D± is described in the USB2.0 Specification Revision 2.0 published Apr. 27, 2000. The USB3 standard defines a Super Speed (5 Gbps) mode over USB2. The USB3 is fully described in the "USB 3.0 Specification" revision 1.0, published on Nov. 12, 2008. The specifications of the USB2 and USB3 standards are incorporated herein by reference in their entirety merely for the useful understanding of the background of the invention.

There are several types of USB connectors; the most common are Standard-A plugs and receptacles. The data connectors in the Standard-A plug are recessed in the plug as compared to the outside power connectors. This permits the power to connect first, thus preventing data errors by allowing the device to power up first and then transfer data. The pinout of a Standard-A plug and receptacle as defined in the USB 3.0 specification is detailed in Table 4.

TABLE 4

| Pin Number | Pin Name | Function |
|---|---|---|
| 1. | VBUS | Power |
| 2. | D− | USB 2 Diff pair |
| 3. | D+ | |
| 4. | GND | Ground for power return |
| 5. | StdA_SSRX− | Super speed RX diff pair |
| 6. | StdA_SSRX+ | |
| 7. | GND_Drain | Ground for signal return |
| 8. | StdA_SSTX− | Super speed TX diff pair |
| 9. | StdA_SSTX+ | |
| 10. | Shield | |

The USB specifications provide a 5V±5% supply on a single wire from which connected USB devices may draw power between the positive and negative bus power lines. A unit load is defined as 100 mA in USB 2.0 and 150 mA in USB3. A maximum of 5 unit loads (500 mA) can be drawn from a port in USB 2.0 and 6 unit loads in USB 3.0. A handheld device can draw a maximum of 1.8 A of current at 5.25V from a dedicated charging port.

Multimedia interfaces that allow dual connectivity of both HDMI and DisplayPort have been recently developed. Such interfaces can process data compliant with the HDMI and DisplayPort. An example for an interface that allows interoperability between HDMI and DisplayPort multimedia interfaces can be found in a co-pending U.S. patent application Ser. No. 12/558,673 (hereinafter the '673 application), assigned to the common assignee and incorporated herein by reference in its entirety merely for the useful understanding of the background of the invention.

However, the multimedia interfaces, e.g., HDMI and DisplayPort cannot supply power for charging handheld devices. To enable power charging of such devices an additional USB connector is included in the handheld devices. The USB, as mentioned above, provides other functionality such as data transfers. However, the USB cannot support streaming of uncompressed video.

Therefore, in order to enable both streaming of video and power charging, a handheld device should be equipped with at least two connectors, e.g., a USB and a HDMI/DisplayPort, or any other power charging input and multimedia interface. However, this has certain drawbacks, for example, a handheld device having two connectors increases the complexity of the design and the cost of the device. In today's competitive market, this is a major disadvantage. In addition, streaming of video consumes a lot of power, thus quickly drains the battery of the device. As a result, streaming a movie from the handheld device to a TV, for example, would require charging the device's battery while streaming the data. Thus, a solution that would enable simultaneous power charging and data streaming through a single connector in handheld devices can provide greater flexibility and benefit to users of such devices.

SUMMARY OF THE INVENTION

Certain embodiments disclosed herein include an apparatus for enabling simultaneous multimedia content streaming and power charging of handheld devices. The apparatus comprises a universal connector installed in a first device and configured to enable connectivity of at least one multimedia display interface and at least one data interface with a second device, the first device is connected to the second device using a charging-streaming cable having, at one end, a first connector compliant with the universal connector, and at the other end, a second connector compliant with a multimedia display interface and a third connector compliant with a data interface of the second device, wherein streaming of the multimedia content is from the universal connector in the first device to the second connector in the second device and power charging of the first device is through the third connector of the second device; and a detector for determining a type of the multimedia display interface of the second device and setting the apparatus to process signals according to the determined multimedia display interface type.

Certain embodiments disclosed herein also include an apparatus for enabling simultaneous multimedia content streaming and power charging of handheld devices. The apparatus comprises a universal connector installed in a first device and configured for enabling connectivity of a multimedia display interface with a second device, the first device is connected to the second device using a cable having, at one end, a first connector compliant with a universal connector and, at the other end, a second connector compliant with the multimedia display interface, wherein streaming of a multimedia content is from the universal connector in the first device to the second connector in the second device and power charging is from the second device to the first device through the cable.

Certain embodiments disclosed herein also include an apparatus for enabling simultaneous data content streaming and power charging of handheld devices. The apparatus comprises a universal connector installed in a first device and configured to enable connectivity of at least one data interface with a second device, the first device is connected to the second device using a cable having, at one end, a first connector compliant with universal connector and, at the other end, a second connector compliant with a data interface type, wherein streaming of the data content is from the universal connector in the first device to the second connector in the second device and from the second connector in the second device to the universal connector in the first device and power charging is from the second device to the first device through the cable.

Certain embodiments disclosed herein further include a charging-streaming cable for enabling simultaneous multimedia content streaming and power charging of handheld devices. The cable comprises a universal connector including a plurality of contact pins for providing connectivity for multimedia display interface signals and data interface signals; a first multimedia connector including a plurality of contact pins providing connectivity for multimedia display interface signals for streaming of the multimedia content; a second connector compliant with a data interface and including a plurality of contact pins providing connectivity power charging signals, wherein the universal connector is installed at one end of the cable, and the first and second connectors are installed at the other end of the cable; and a plurality of conducting wires for coupling a first group of the plurality of contact pins of the universal connector to the plurality of contact pins of the first connector to enable streaming of the multimedia content, and for coupling a second group of plurality of contact pins of the universal connector to the plurality of contact pins of the second connector to enable power charging of a handheld device connected at the other end of the second connector.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
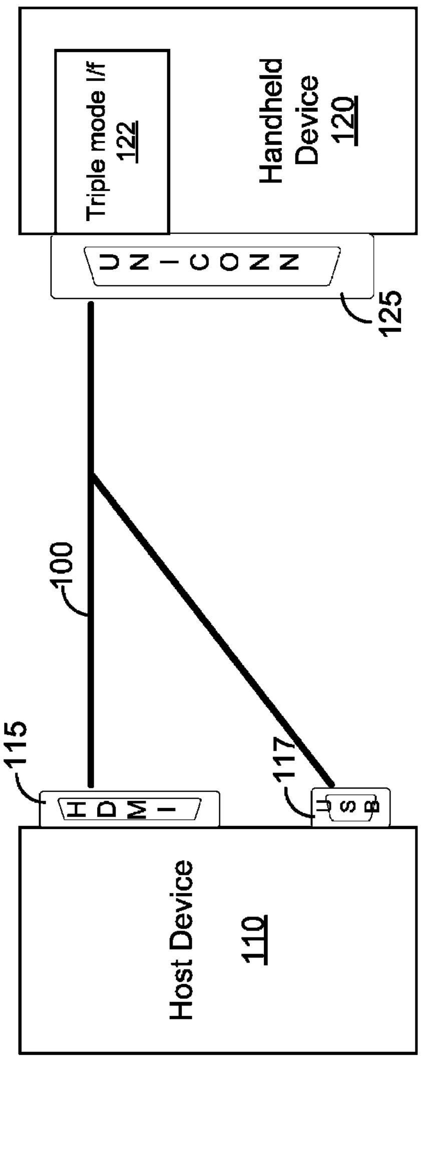
FIG. 1 is a schematic diagram illustrating the connection between a handheld device and a HDMI compliant host device using a charging-streaming cable according to an embodiment of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In accordance with certain embodiments, a handheld device is assembled to include a single connector (hereinafter the "Unified/Universal Connector" or UNICONN connector) that supports USB, DisplayPort, DiiVA, and HDMI connectivity. The handheld device is connected using a cable (hereinafter a "charging-streaming cable") to a host device that includes at least a USB connector and a multimedia interface type connector. The handheld device may include, but is not limited to, a smartphone, a tablet computer, a mobile phone, a personal digital assistant (PDA), a camcorder, and the like. The host device may include, but is not limited to, a TV, or a monitor.

The UNICONN connector together with the charging-streaming cable enables the streaming of high definition multimedia content from the handheld device (acting as a source) to the host device (acting as a sink), while charging the battery of the handheld device by drawing power from the host device. Thus, the charging-streaming cable, at one end is connected to the handheld device, and at the other end to the host device.

The handheld device recognizes, using a multi-mode connectivity interface, the type of USB port connected at the other end of the charging-streaming cable, and draws unit loads from the USB host device. In accordance with an exemplary embodiment when the device is connected to a USB port, a maximum of 5 unit loads (e.g., 500 mA) can be drawn from the port.

In one embodiment, the charging-streaming cable may be connected to a handheld device, at one end, while the other end of the cable is coupled to a host device (for streaming data) and to a USB power adapter for battery charging. The reorganization of a USB port versus a USB power adapter is performed by the multi-mode connectivity interface, based on the state of the D+ and D− pins in the UNICONN connector. That is, if these pins are shorted, then a USB power adapter is connected at the other end of the cable; otherwise, a USB port is connected. The charging current flows on a $V_{BUS}$ wire. The streaming of high definition multimedia content is according to the multimedia interface type in the host device. Various exemplary embodiments supported by the different types of connectivity are described herein.

The UNICONN connector is structured, in one embodiment, to include a plurality of contact pins and a housing (chassy) in which the pins are arranged. The pins, at one end, are connected to the triple-mode connectivity interface 120, and at another end to a contact plate into which a receptacle connector is inserted. In another embodiment, the UNICONN connector is structured to include a housing where the pins are arranged. The pins, at one end, are connected to the data-multimedia cable 100, and at another end, to the receptacle connector. The housing may be formed from a conductive material covered by a plastic cover.

The UNICONN connector is designed to transfer signals defined at least by any one of the HDMI, DisplayPort, DiiVA, and USB interfaces. Specifically, each pin in the UNICONN connector serves a different function depending on the type of the connectivity of the device in which the UNICONN connector is installed. Specifically, the UNICONN connector supports both the streaming through the HDMI or DisplayPort interface and power charging through a USB interface.

In accordance with one embodiment, the UNICONN connector includes 19 pins. Table 5 lists the pins of the UNICONN connector and their signals of HDMI, DiiVA, USB, and DisplayPort interfaces.

TABLE 5

| Pin Number | HDMI | DisplayPort | USB | DiiVA STP type cable |
|---|---|---|---|---|
| 1. | TMDS_Data2+ | ML_lane3N | NC | HL+ |
| 2. | Shield | GND | GND | GND |
| 3. | TMDS_Data2− | ML_lane3P | NC | HL− |
| 4. | TMDS_Data1+ | ML_lane2N | NC | VL0+ |
| 5. | +5V | DP_PWR | NC | NC |
| 6. | TMDS_Data1− | ML_lane2P | NC | VL0− |
| 7. | TMDS_Data0+ | ML_lane1N | stdX_SSTX− | VL1+ |

TABLE 5-continued

| Pin Number | HDMI | DisplayPort | USB | DiiVA STP type cable |
|---|---|---|---|---|
| 8. | Shield | GND | GND Drain | GND |
| 9. | TMDS_Data0− | ML_lane1P | stdX_SSTX+ | VL1− |
| 10. | TMDS_Clk+ | ML_lane0N | stdX_SSRX− | VL2+ |
| 11. | Shield | GND | GND Drain | GND |
| 12. | TMDS_Clk− | ML_lane0P | stdX_SSRX+ | LV2− |
| 13. | D− | D− | D− | D− |
| 14. | D+ | D+ | D+ | D+ |
| 15. | SDA | AUX_CHP | NC | NC |
| 16. | SCL | AUX_CHN | NC | NC |
| 17. | DDC/CEC Ground | Return | GND | GND |
| 18. | VBUS | VBUS | VBUS | VBUS |
| 19. | CEC | HPD | NC | NC |

In accordance with another embodiment, the UNICONN connector includes 16 pins. Table 6 lists the pins of the UNICONN and their signals of HDMI, DiiVA, USB, and DisplayPort interfaces. It should be noted that the pin reduction is due to the use of the housing (chassy) as the reference ground (GND) conductor.

TABLE 6

| Pin Number | HDMI | DP | USB | DiiVA (STP) |
|---|---|---|---|---|
| 1. | TMDS_Data2+ | ML_lane3N | NC | HL+ |
| 2. | TMDS_Data2− | ML_lane3P | NC | HL− |
| 3. | TMDS_Data1+ | ML_lane2N | NC | VL0+ |
| 4. | +5V | DP_PWR | NC | NC |
| 5. | TMDS_Data1− | ML_lane2P | NC | VL0− |
| 6. | TMDS_Data0+ | ML_lane1N | stdX_SSTX− | VL1+ |
| 7. | TMDS_Data0− | ML_lane1P | stdX_SSTX+ | VL1− |
| 8. | TMDS_Clk+ | ML_lane0N | stdX_SSRX− | VL2+ |
| 9. | TMDS_Clk− | ML_lane0P | stdX_SSRX+ | VL2− |
| 10. | D− | D− | D− | D− |
| 11. | D+ | D+ | D+ | D+ |
| 12. | SDA | AUX_CHP | NC | NC |
| 13. | SCL | AUX_CHN | NC | NC |
| 14. | DDC/CEC Ground | Return | GND | GND |
| 15. | VBUS | VBUS | VBUS | VBUS |
| 16. | CEC | HPD | NC | NC |

It should be noted that the indicated pin numbers in tables 5 and 6 are only examples used for ease of understanding. One of ordinary skill in the art recognizes that the pin assignments may be designed to be in any location based on design expediency.

One embodiment of the invention, illustrated in FIG. 1, includes a data-charging-streaming cable 100 that enables a proper connection between a HDMI compliant host device 110 and a handheld device 120 that includes a multi-mode connectivity interface 122. The host device 110 includes a HDMI connector 115 and a USB connector 117. The handheld device 120 includes a UNICONN connector 125.

The multi-mode connectivity interface 122 is a physical layer interface capable of processing HDMI, DiiVA, DisplayPort, and USB signals. In accordance with an embodiment of the invention, the multi-mode connectivity interface implements an automatic recognition mechanism for determining the type of the multimedia interface connected at the other end of the cable 100, and configures the handheld device 120 accordingly. For example, if the host device 110 supports a HDMI, the multi-mode connectivity interface 122 recognizes that a HDMI type of interface is connected at the other end of the cable 100, and sets the handheld device 120 to process HDMI signals. The multi-mode connectivity interface 122 also recognizes the type of the port's USB interface (e.g., USB2) and requests charging power according to the port type. The automatic recognition mechanism is described in detail below.

A proper connection between devices 110 and 120 is enabled by means of the charging-streaming cable 100, which is constructed in accordance with an embodiment of the invention. Specifically, the cable 100 provides a transport medium between two different types of interfaces: UNICONN in the handheld device 120 and USB and HDMI in the host device 110. Thus, the charging-streaming cable 100 allows streaming data from the handheld device 120 to the host device 110, according to the HDMI standard, while charging the device's 120 battery using power supplied by the USB port of the connector 117. Further, data can be transmitted from the USB connector 117 to the handheld device 120, according to the USB standard, while streaming multimedia content and battery charging.

The charging-streaming cable 100 comprises, at one end, a UNICONN connector, and at the other end, a HDMI connector with 19 pins and a USB connector with 9 pins. The UNICONN connector 125 includes either 19 or 16 pins, depending on the connector type.

Figure 2A:
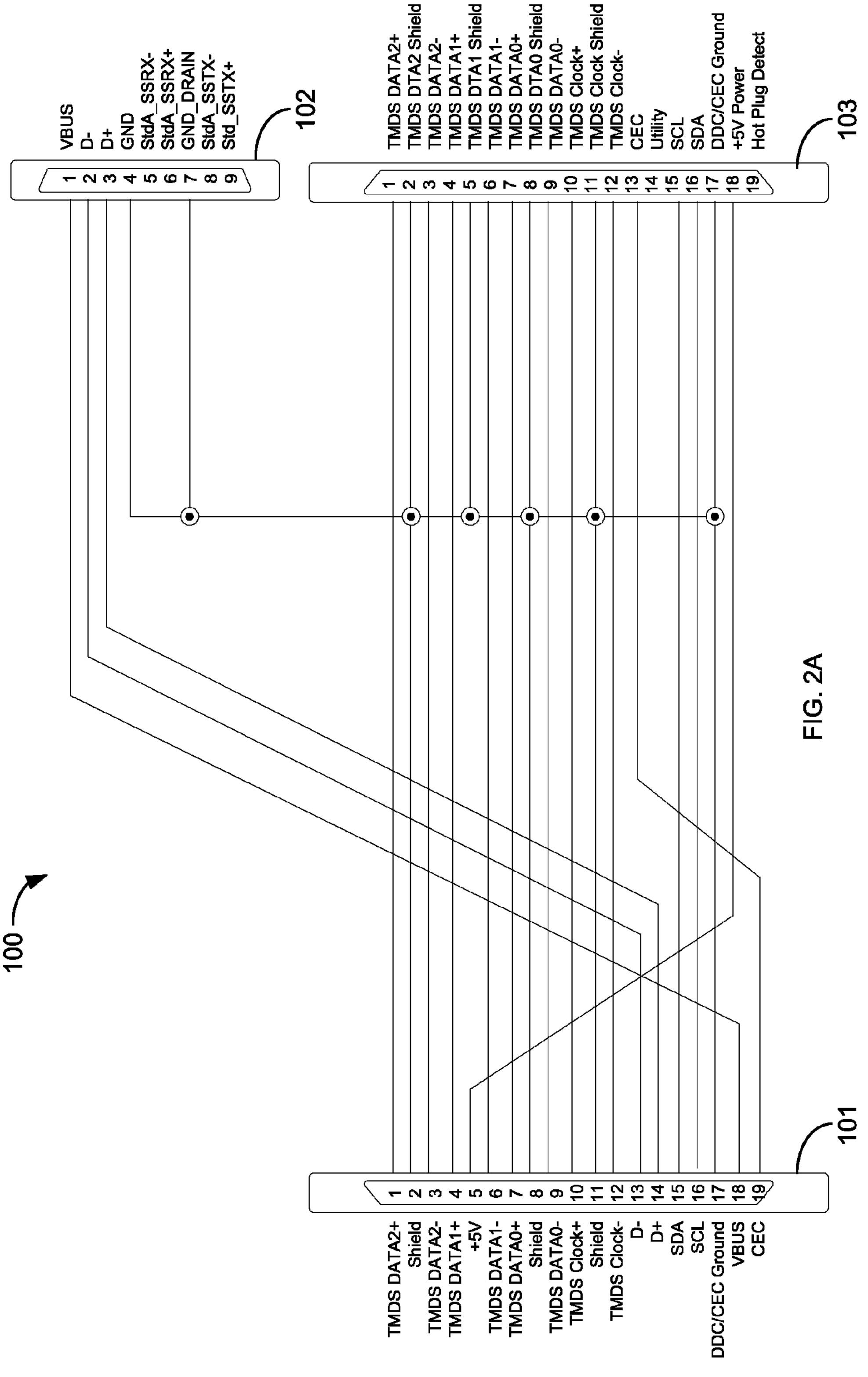
FIGS. 2A and 2B are schematic diagrams illustrating the wiring of different types of charging-streaming cables connected to a HDMI compliant host device constructed according to certain embodiments of the invention.

The wiring of the cable 100 with UNICONN connector including 19 pins is illustrated in FIG. 2A. For example, as shown in FIG. 2A, the $V_{BUS}$ (pin number 18) at a UNICONN connector 101 is connected to a $V_{BUS}$ pin (pin number 1) at the USB type connector 102; and the TMDS data pins (pin numbers 1, 3, 4, 6, 7, and 9, 10, 12) at the connector 101 are respectively wired to pin numbers 1, 3, 4, 6, 7, and 9, 10, 12 at the HDMI connector 103.

Figure 2B:
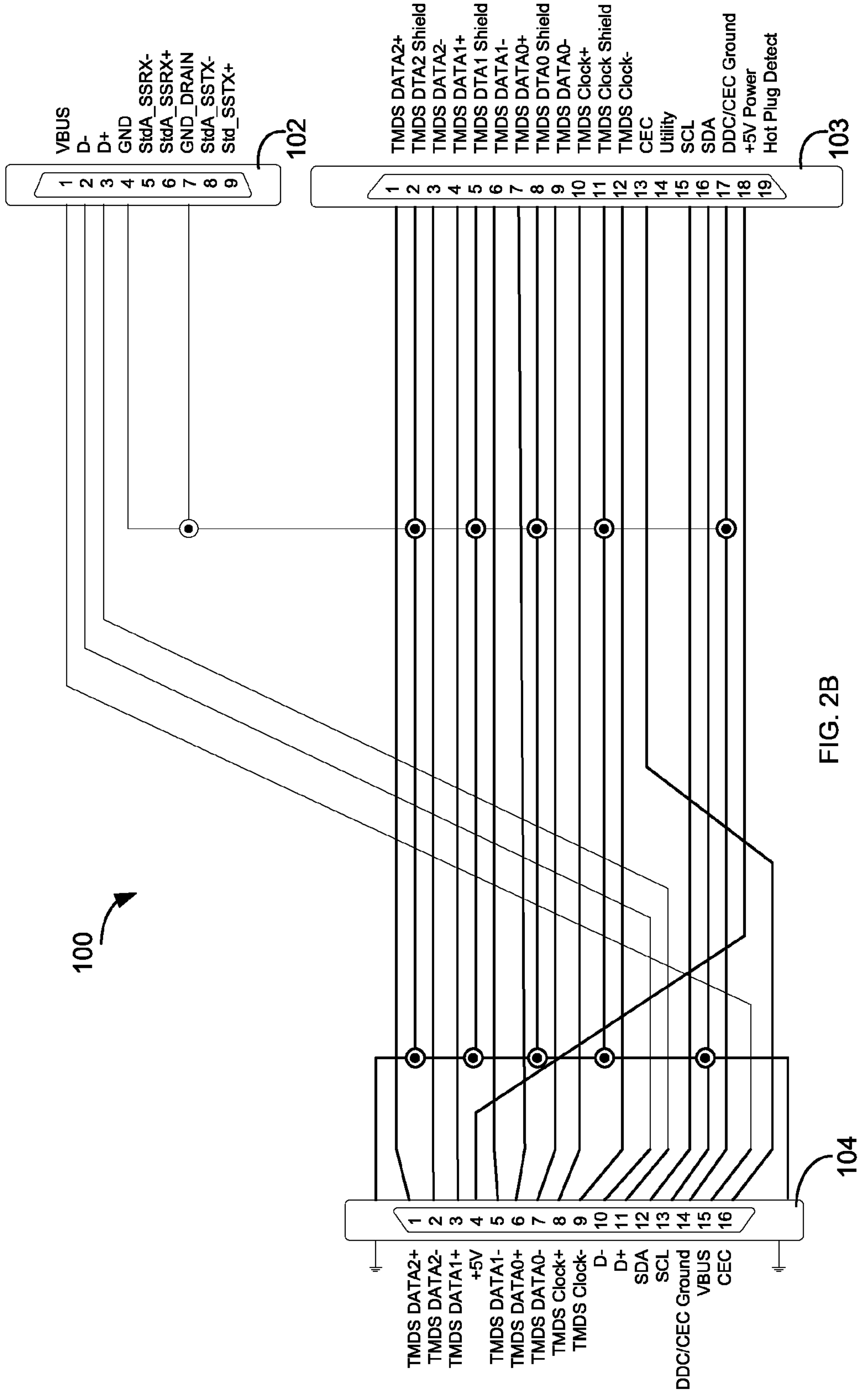

The wiring of the cable 100 with a UNICONN connector 104 including 16 pins is illustrated in FIG. 2B. As shown in FIG. 2B, the $V_{BUS}$ pin (pin number 15) at the UNICONN connector 104 is connected to a $V_{BUS}$ pin (pin number 1) at the USB type connector 102; and the TMDS data pins (pin numbers 1, 2, 3, 5, 6, 7, 8, and 9) at the connector 104 are respectively wired to pin numbers 1, 3, 4, 6, 7 and 9, 10 and 12 at the HDMI connector 103. One of ordinary skill in the art recognizes that the pin assignments may be designed to be in any location based on design expediency.

Figure 3:
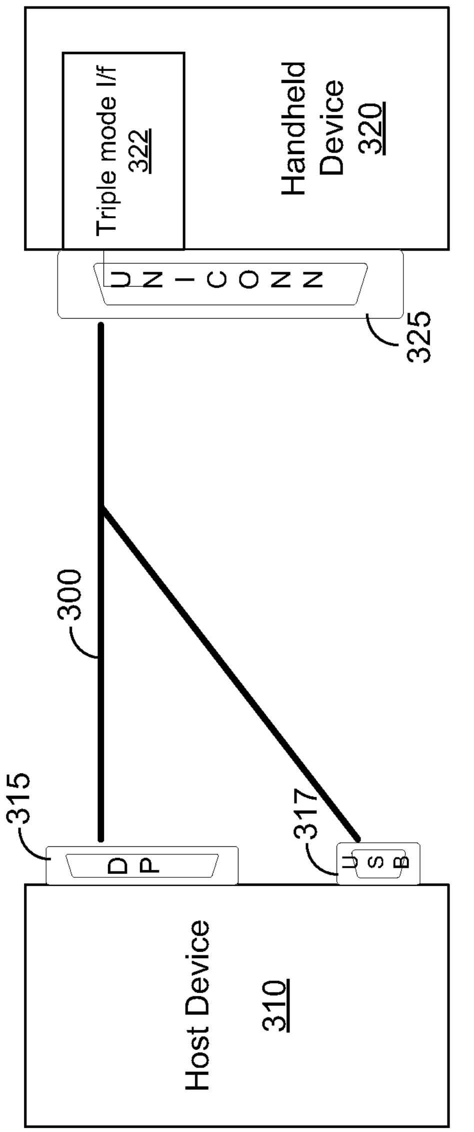
FIG. 3 is a schematic diagram illustrating the connection between a handheld device and a DisplayPort (DP) compliant host device using a charging-streaming cable according to an embodiment of the invention.

FIG. 3 shows a connection between a DisplayPort compliant host device 310 and a handheld device 320 that includes a multi-mode connectivity interface 322. The handheld device 320 is equipped with a UNICONN connector 325, while the host device 310 includes a DisplayPort (DP) connector 315 and a USB connector 317. The multi-mode connectivity interface 322 operates as the interface 122 mentioned above.

A proper connection between devices 310 and 320 is enabled by means of the charging-streaming cable 300, constructed in accordance with an embodiment. Specifically, the cable 300 provides a transport medium between two different types of interfaces: UNICONN, at one end, and DisplayPort and USB, at the other end of the cable 300. Thus, the charging-streaming cable 300 allows streaming data from the handheld device 320 to the host device 310, according to the DisplayPort standard, while charging the device 320 through the USB port of the connector 317. Further, data can be transmitted from the USB connector 317 to the handheld device 320, according to the USB standard, while streaming multimedia content and battery charging.

The charging-streaming cable 300 comprises, at one end, a UNICONN connector, and, at the other end, a DisplayPort connector with 20 pins as well as a USB port with 9 pins. The UNICONN connector includes either 19 or 16 pins, depending on the connector type.

Figure 4A:
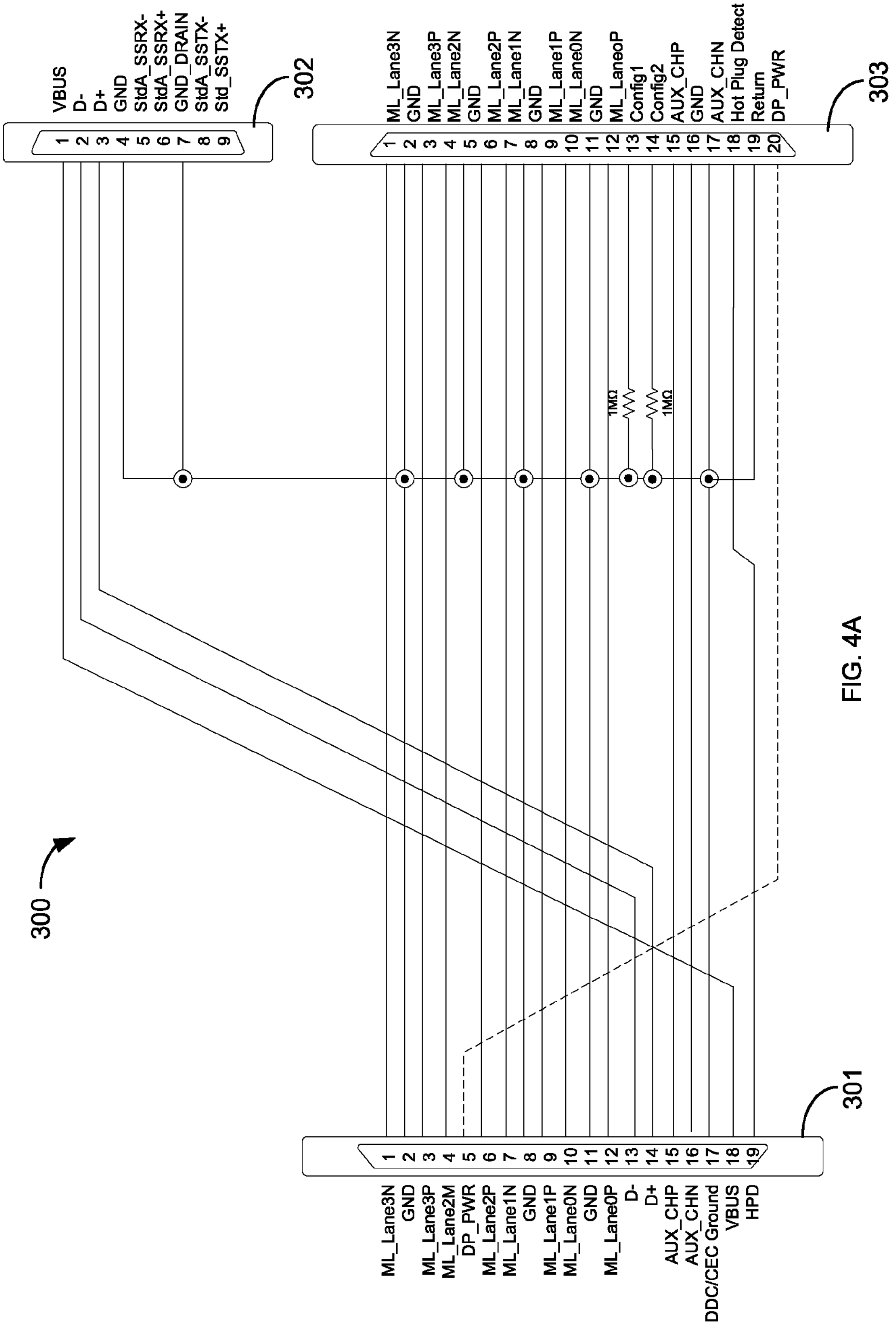
FIGS. 4A and 4B and 4C and 4D are schematic diagrams illustrating the wiring of different types of charging-streaming cables connected to a DisplayPort compliant host device designed constructed according to certain embodiments of the invention.

The wiring of the cable 300, according to an embodiment of the invention, with a UNICONN connector (301) including 19 pins is illustrated in FIG. 4A. For example, as shown in FIG. 4A, the $V_{BUS}$ pin (pin number 18) at the UNICONN connector 301 is connected to a $V_{BUS}$ (pin number 1) at the USB type connector 302; and the lane pins (pin numbers 1, 3, 4, 6, 7, 9, 10, and 12) at the connector 301 are respectively wired to pins 1, 3, 4, 6, 7, 9, 10, and 12 at the DisplayPort connector 303.

Figure 4B:
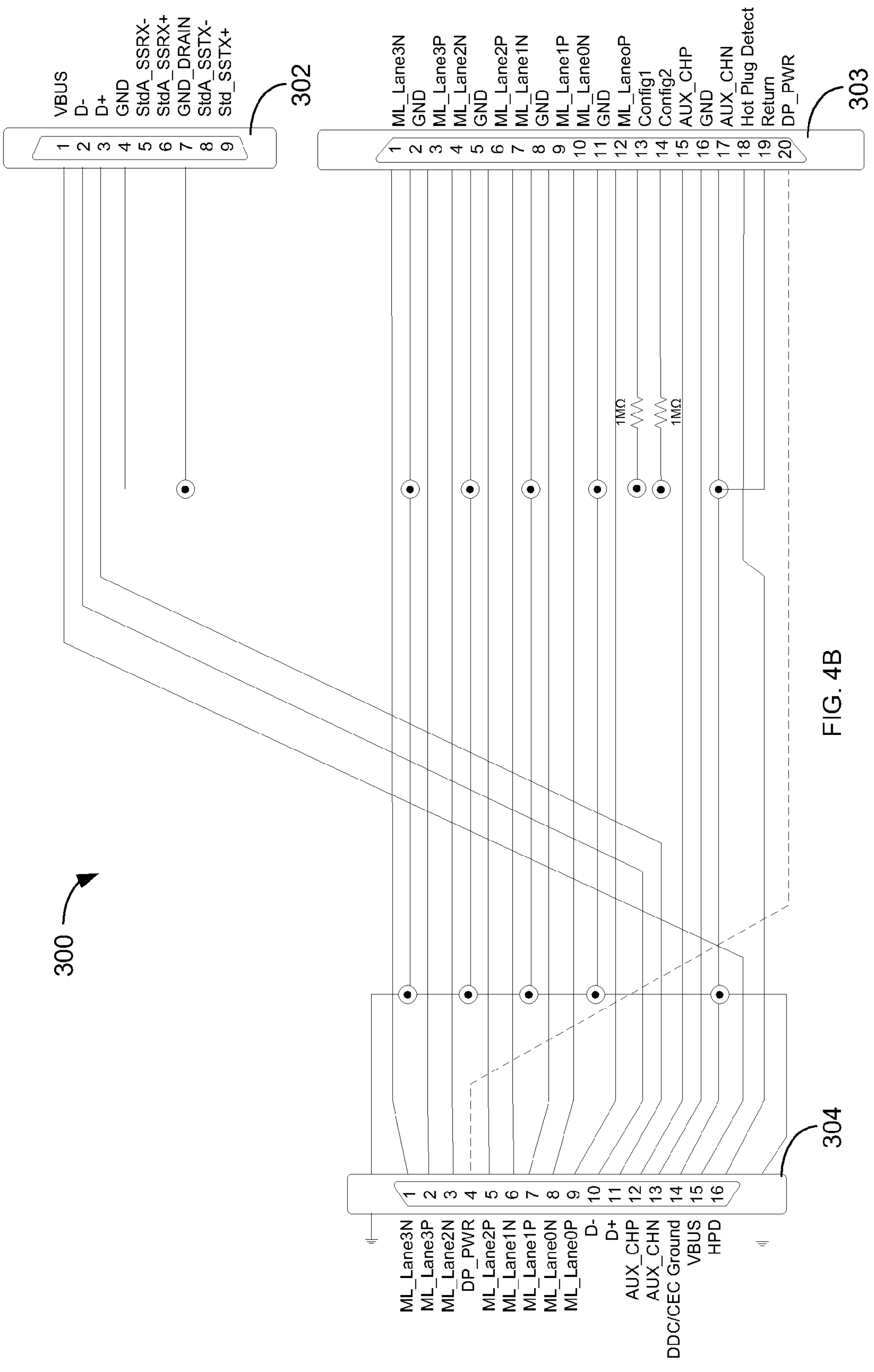

The wiring, according to another embodiment, of the charging-streaming cable 300 with a UNICONN connector (304) including 16 pins is illustrated in FIG. 4B. For example, as shown in FIG. 4B, the $V_{BUS}$ (pin number 15) at the UNICONN connector 304 is connected to a $V_{BUS}$ pin (pin number 1) at the USB type connector 302; and the lane pins (pin numbers 1, 2, 3, 5, 6, 7, 8 and 9) in the connector 304 are respectively wired to pins 1, 3, 4, 6, 7, 9, 10, and 12 at the DisplayPort connector 303. One of ordinary skill in the art should recognize that the pin assignments may be designed to be in any location based on design expediency.

Figure 4C:
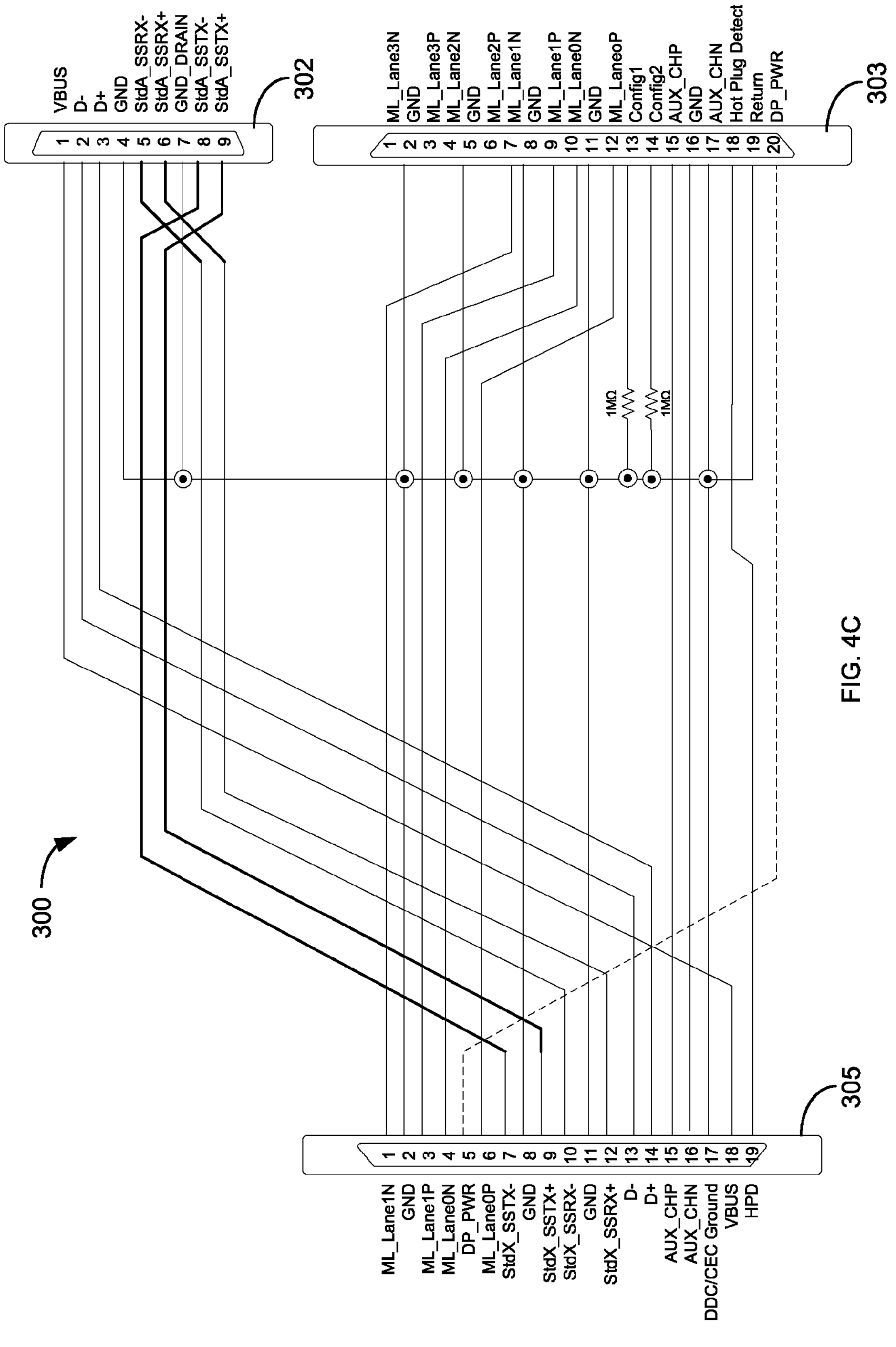

The wiring, according to another embodiment, of the charging-streaming cable 300 with a UNICONN connector (305) including 19 pins is illustrated in FIG. 4C. For example, as shown in FIG. 4C, the $V_{BUS}$ (pin number 18) at the UNICONN connector 305 is connected to a $V_{BUS}$ pin (pin number 1) at the USB type connector 302, and the lane pins (pin numbers 1, 3, 4, and 6) in the connector 305 are respectively wired to pins 7, 9, 10, and 12 at the DisplayPort connector 303.

Figure 4D:
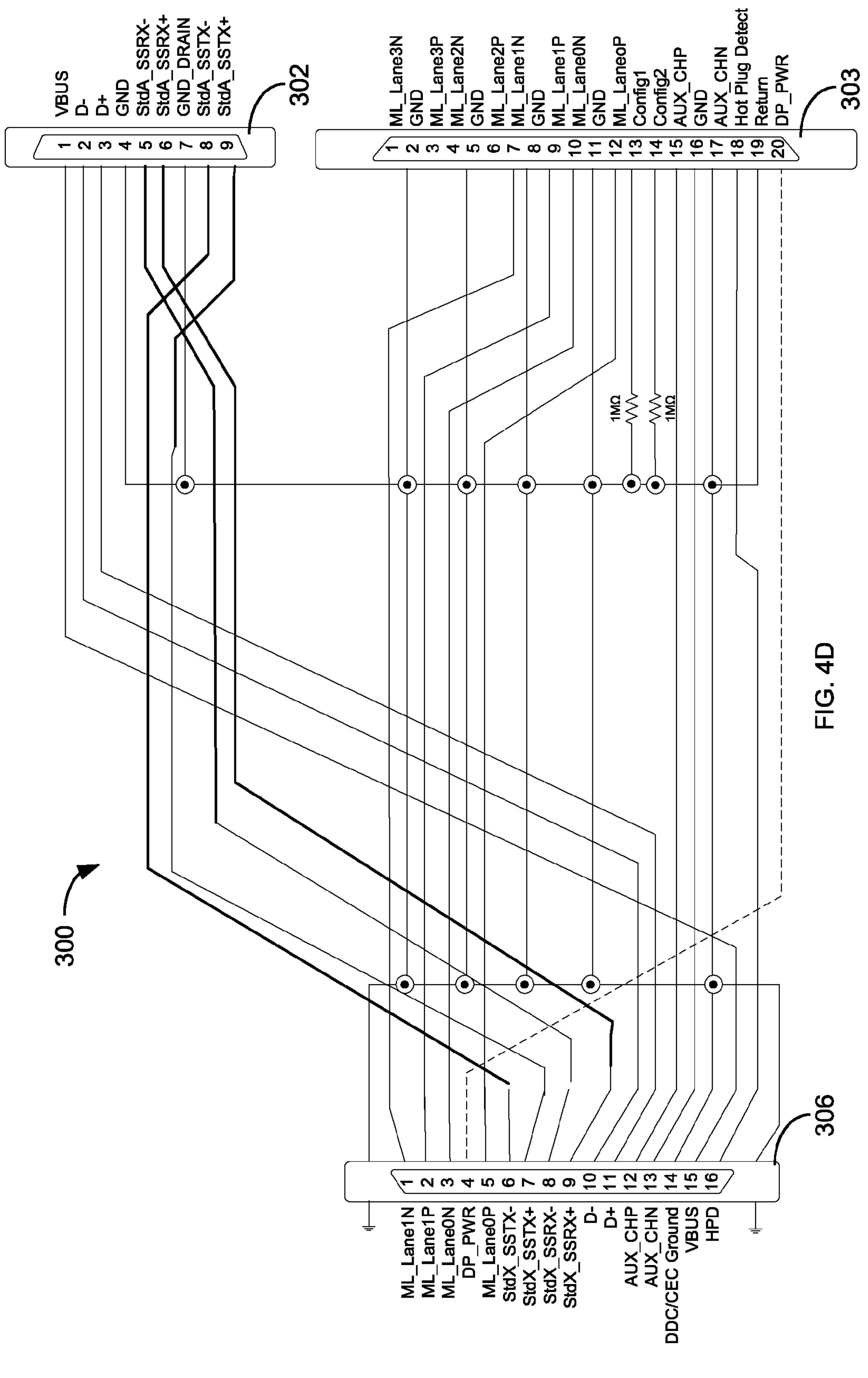

According to another embodiment, the wiring of the charging-streaming cable 300 with a UNICONN connector (306) including 16 pins is illustrated in FIG. 4D. For example, as shown in FIG. 4D, the $V_{BUS}$ (pin number 18) at the UNICONN connector 304 is connected to a $V_{BUS}$ pin (pin number 1) at the USB type connector 302; and the lane pins (pin numbers 1, 2, 3, and 5) in the connector 304 are respectively wired to pins 7, 9, 10, and 12 at the DisplayPort connector 303. In the embodiments illustrated in FIGS. 4C and 4D, the USB type connector 302 is a USB 3.0 connector, where the signals SSRX+, SSRX−, SSTX+, and SSTX− are connected from the UNICONN connector (305 or 306) to the USB connector 302. This allows streaming data content between the UNICONN connector (305 or 306) in the handheld device and the USB connector 302 in the host device.

Figure 5:
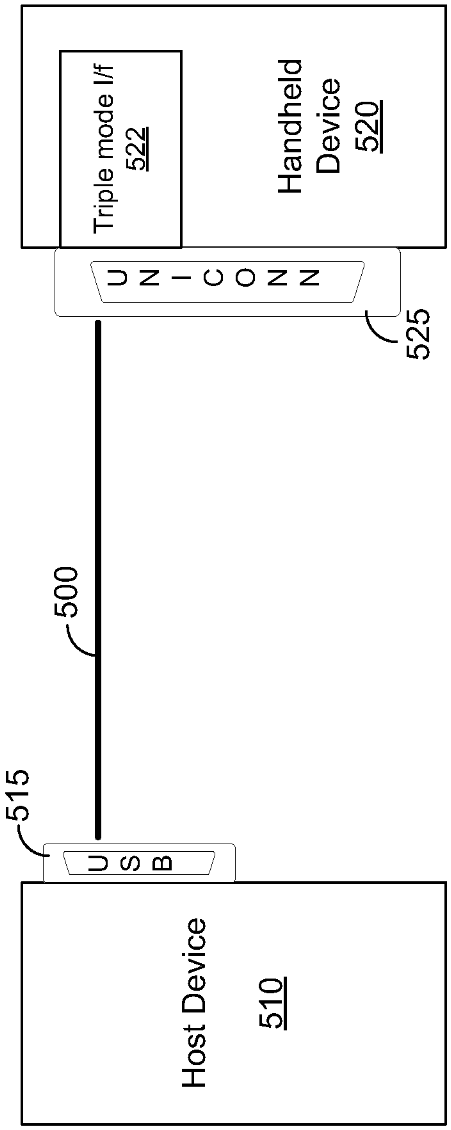
FIG. 5 is a schematic diagram illustrating the connection between a handheld device and a USB host device using a cable designed according to an embodiment of the invention.

FIG. 5 shows a connection between a host device 510 equipped only with a USB connector 515 and a handheld device 520 that includes a UNICONN connector 525 and a multi-mode connectivity interface 522. The multi-mode connectivity interface 522 operates as the interface 122 mentioned above.

Figure 6A:
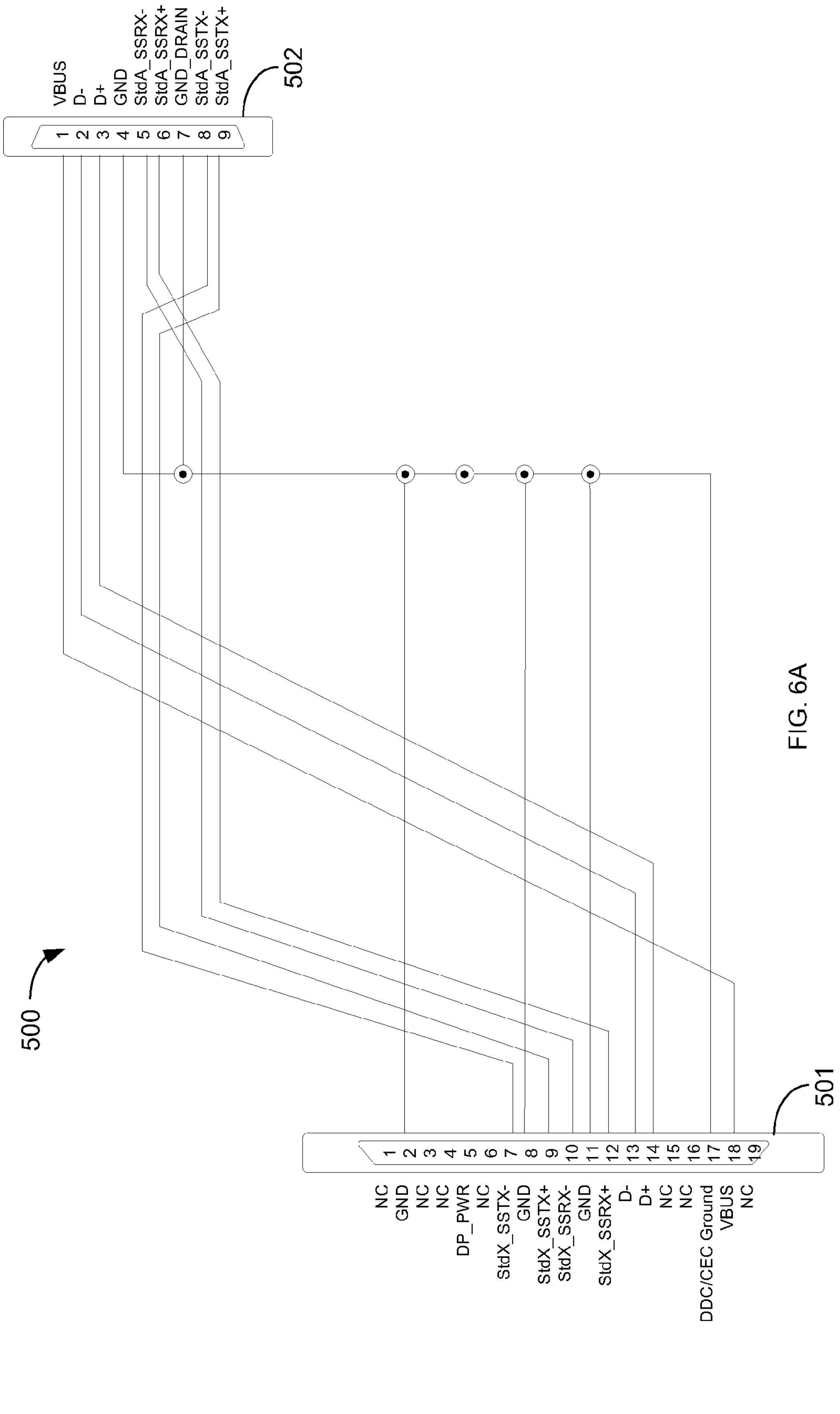
FIGS. 6A and 6B are schematic diagrams illustrating the wiring of different types of cables connected to a USB host device and constructed according to certain embodiments of the invention.
Figure 6B:
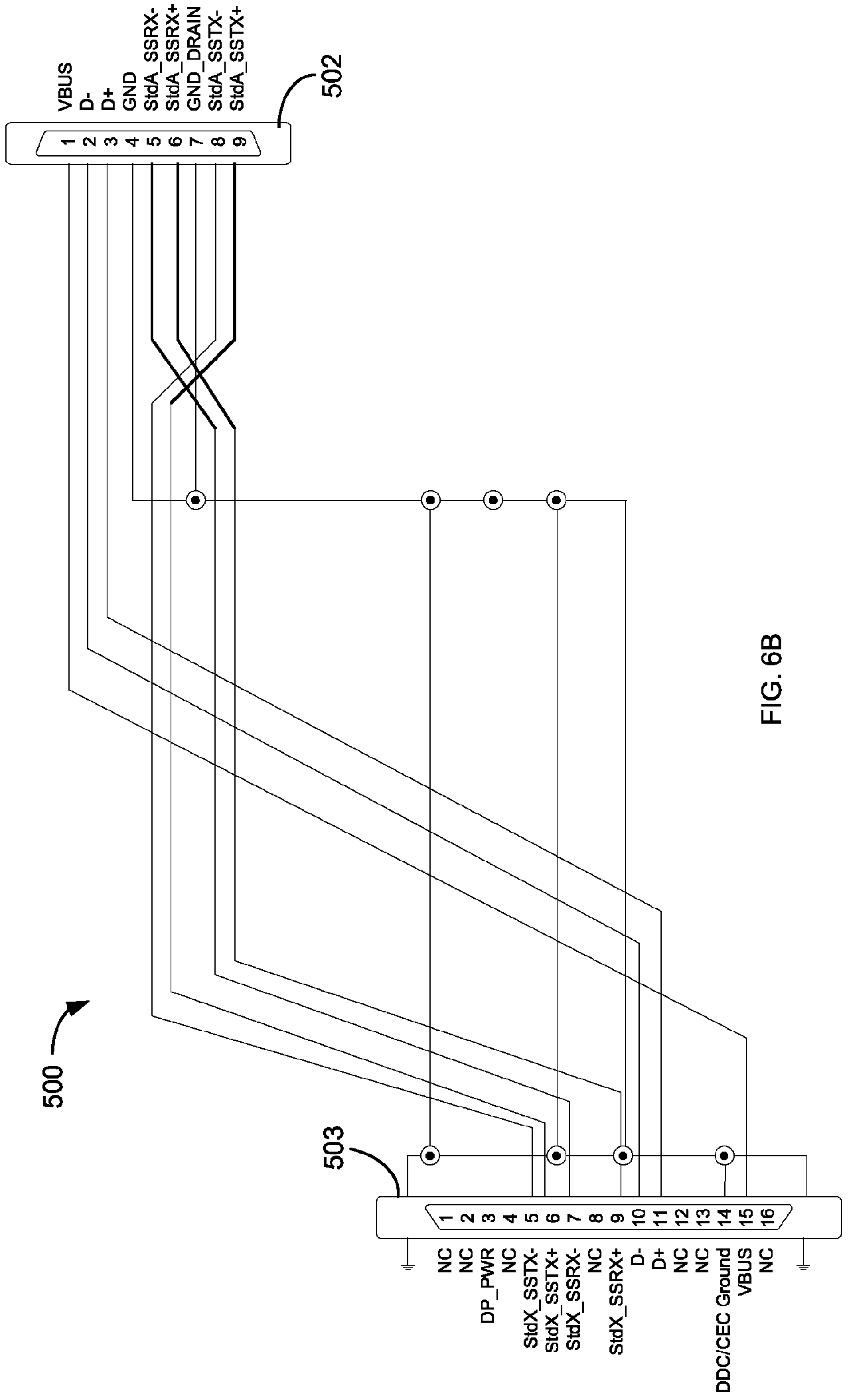

A proper connection between devices 510 and 520 is enabled by means of the charging-streaming cable 500, constructed in accordance with an embodiment of the invention. Specifically, the cable 500 provides a transport medium between two different types of interfaces: UNICONN and USB. The cable 500 comprises, at one end, a UNICONN connector and, at the other end, a USB connector with 9 pins. The UNICONN connector includes either 19 or 16 pins, depending on the connector type. According to an embodiment of the invention, the wiring of the cable 500 with a UNICONN connector (501) including 19 pins is illustrated in FIG. 6A. The wiring of the cable 500, with a UNICONN connector (503) having 16 pins is illustrated in FIG. 6B. In both cables, the connector 502 is a USB connector. One of ordinary skill in the art recognizes that the pin assignments, shown in FIGS. 6A and 6B, may be designed to be in any location based on design expediency.

Figure 7:
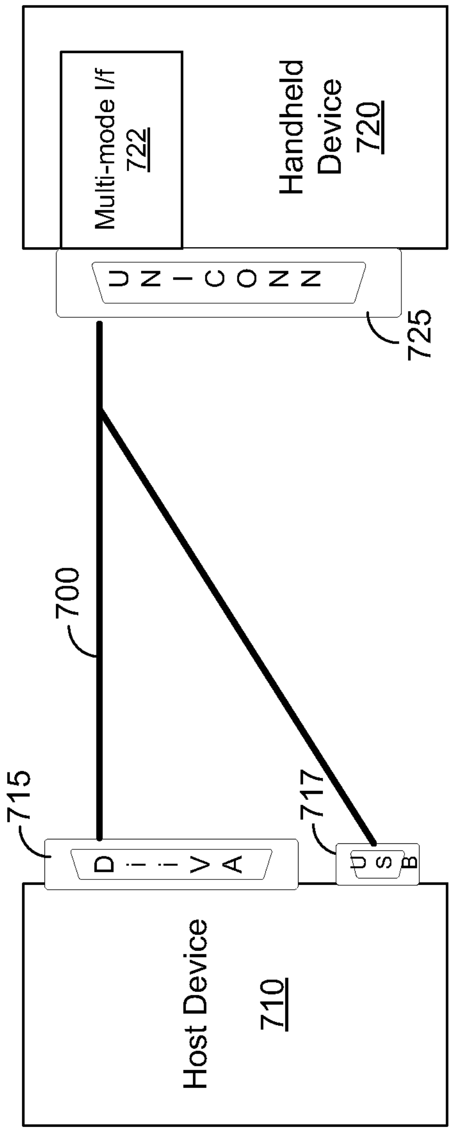
FIG. 7 is a schematic diagram illustrating the connection between a handheld device and a DiiVA compliant host device using different types of charging-streaming cables constructed according to an embodiment of the invention.

FIG. 7 shows a connection between a DiiVA compliant host device 710 and a handheld device 720 that includes a multi-mode connectivity interface 722. The handheld device 722 is equipped with a UNICONN connector 725, while the host device 710 includes a DiiVA connector 715 and a USB connector 717. The multi-mode connectivity interface 722 operates as the interface 122 mentioned above.

A proper connection between devices 710 and 720 is enabled by means of the charging-streaming cable 700, constructed in accordance with an embodiment of the invention. Specifically, the cable 700 provides a transport medium between two different types of interfaces: UNICONN, at one end, and DiiVA and USB, at the other end of the cable 700. Thus, the charging-streaming cable 700 allows streaming data from the handheld device 720 to the host device 710, according to the DiiVA standard, while charging the device 720 through the USB port of the connector 717. Further, data can be transmitted from the USB connector 717 to the handheld device 720, according to the USB standard, while streaming multimedia content and battery charging.

Figure 8A:
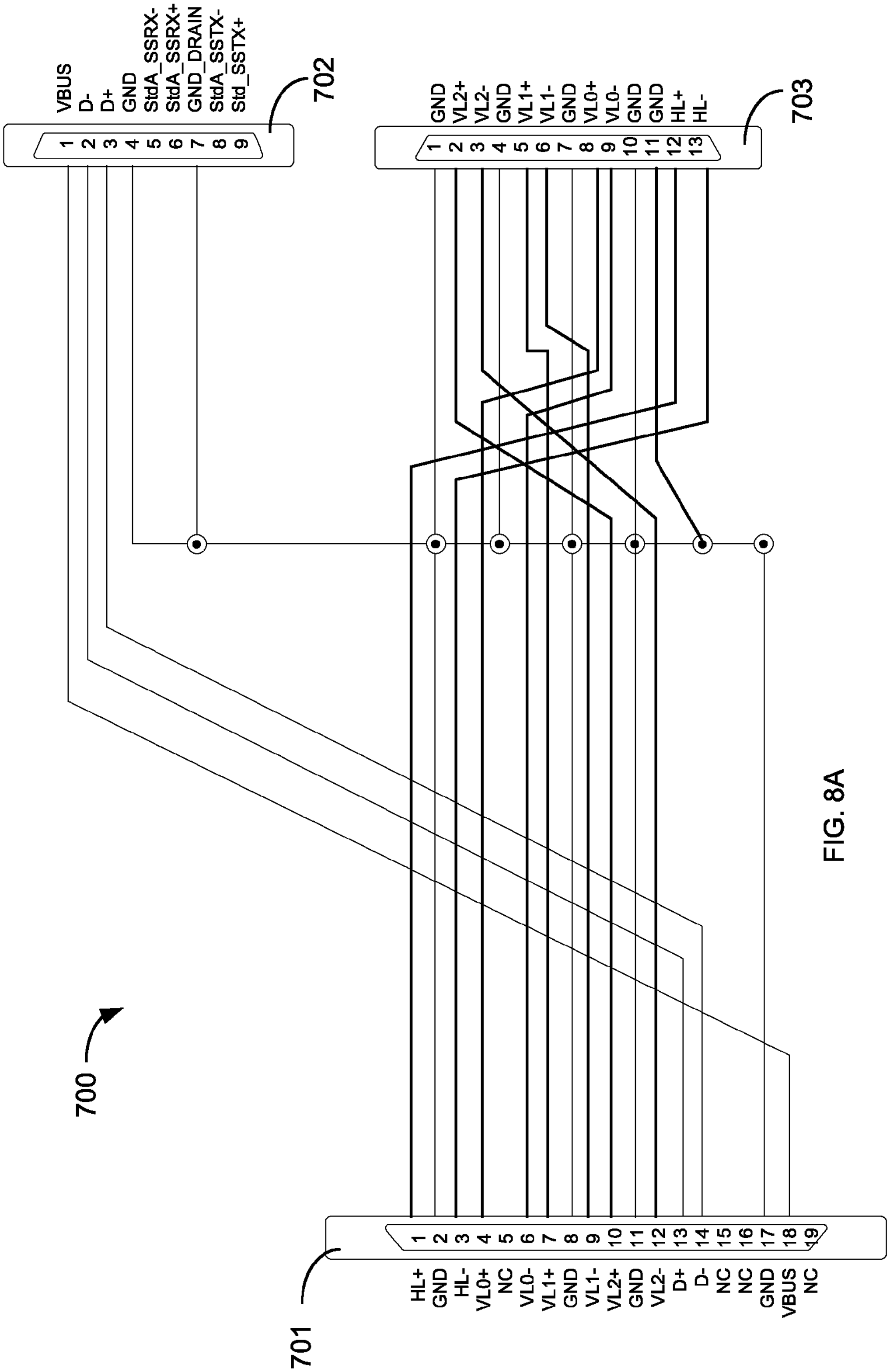
FIGS. 8A and 8B are schematic diagrams illustrating the wiring of different types of charging-streaming cables connected to a DiiVA compliant host device and constructed according to certain embodiments of the invention.

The charging-streaming cable 700 comprises, at one end, a UNICONN connector, and, at the other end, a DiiVA connector with 13 pins as well as a USB port with 9 pins. The UNICONN connector includes either 19 or 16 pins, depending on the connector type. The wiring of the cable 700, according to one embodiment, with a UNICONN connector (701) including 19 pins is illustrated in FIG. 8A. For example, as shown in FIG. 8A, the $V_{BUS}$ pin (pin number 18) at the UNICONN connector 701 is connected to a $V_{BUS}$ (pin number 1) at the USB type connector 702; and the lane pins (pin numbers 1, 3, 4, 6, 7, 9, 10, and 12) at the UNICONN connector 701 are respectively wired to pins 12, 13, 8, 9, 6, 5, 2, and 3 at the DiiVA connector 703.

Figure 8B:
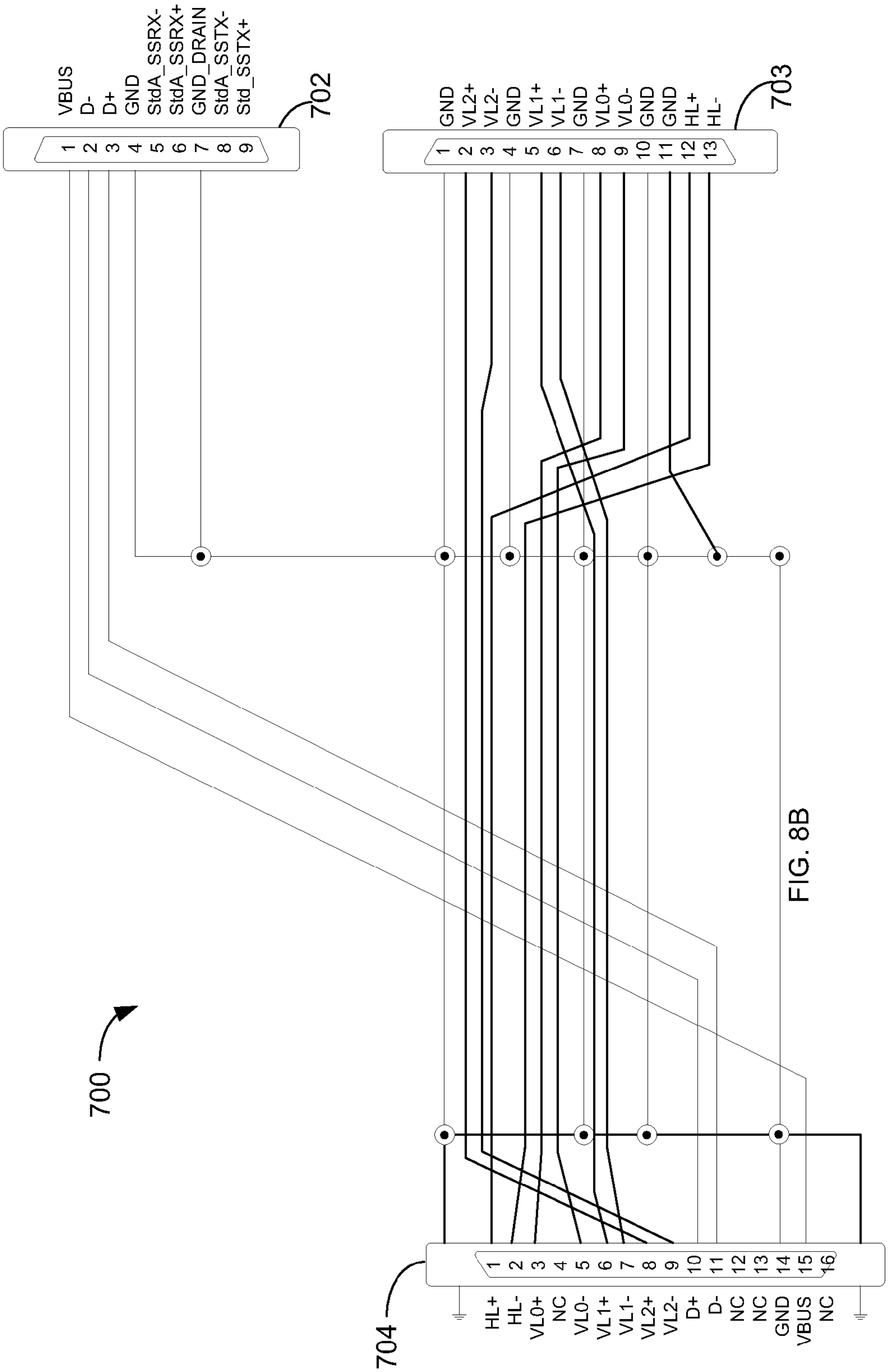

The wiring, according to another embodiment, of the charging-streaming cable 700 with a UNICONN connector (704) including 16 pins is illustrated in FIG. 8B. For example, as shown in FIG. 8B, the $V_{BUS}$ (pin number 15) at the UNICONN connector 704 is connected to a $V_{BUS}$ pin (pin number 1) at the USB type connector 702; and the lane pins (pin numbers 1, 2, 3, 5, 6, 7, 8 and 9) in the UNICONN connector 704 are respectively wired to pins 12, 13, 8, 9, 5, 6, 2, and 3 at the DiiVA connector 703. One of ordinary skill in the art recognizes that the pin assignments may be designed to be in any location based on design expediency. It should be noted that the embodiments depicted in FIGS. 2A, 2B, 4A, 4B, 4C, 4D, 6A, 6B, and 8A, 8B show a USB 3.0 type A connector (e.g., connectors 102, 302, 502, and 702). However, other types of USB connectors, for example, USB 1.0 and USB 2.0 connector types, can be utilized in lieu of the USB 3.0 type A connector.

Figure 9:
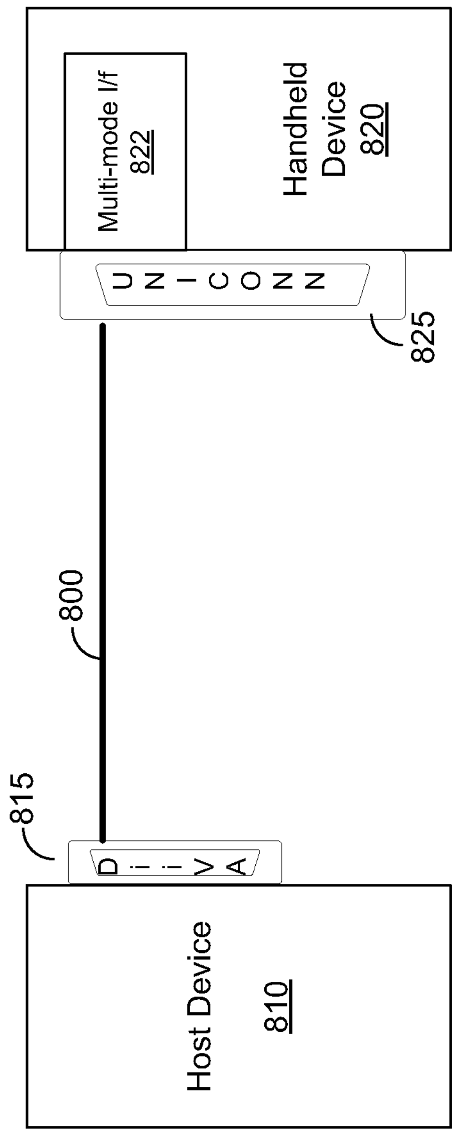
FIG. 9 is a schematic diagram illustrating the connection between a handheld device and a DiiVA compliant host device using PoD cable constructed according to an embodiment of the invention.

FIG. 9 shows a connection between a DiiVA compliant host device 810 and a handheld device 820 that includes a multi-mode connectivity interface 822. The handheld device 822 is equipped with a UNICONN connector 825, while the host device 810 includes a DiiVA connector 815. The multi-mode connectivity interface 822 operates as the interface 122 mentioned above.

A proper connection between devices 810 and 820 is enabled by means of the DiiVA Power-on-Data (PoD) charging cable 800, constructed in accordance with an embodiment of the invention. Specifically, the DiiVA PoD cable 800 provides a transport medium between two different types of interfaces: UNICONN, at one end, and DiiVA, at the other end of the cable 800. Thus, the streaming cable 800 allows streaming data from the handheld device 820 to the host device 810, according to the DiiVA standard and power charging of the handheld device 820.

Figure 10A:
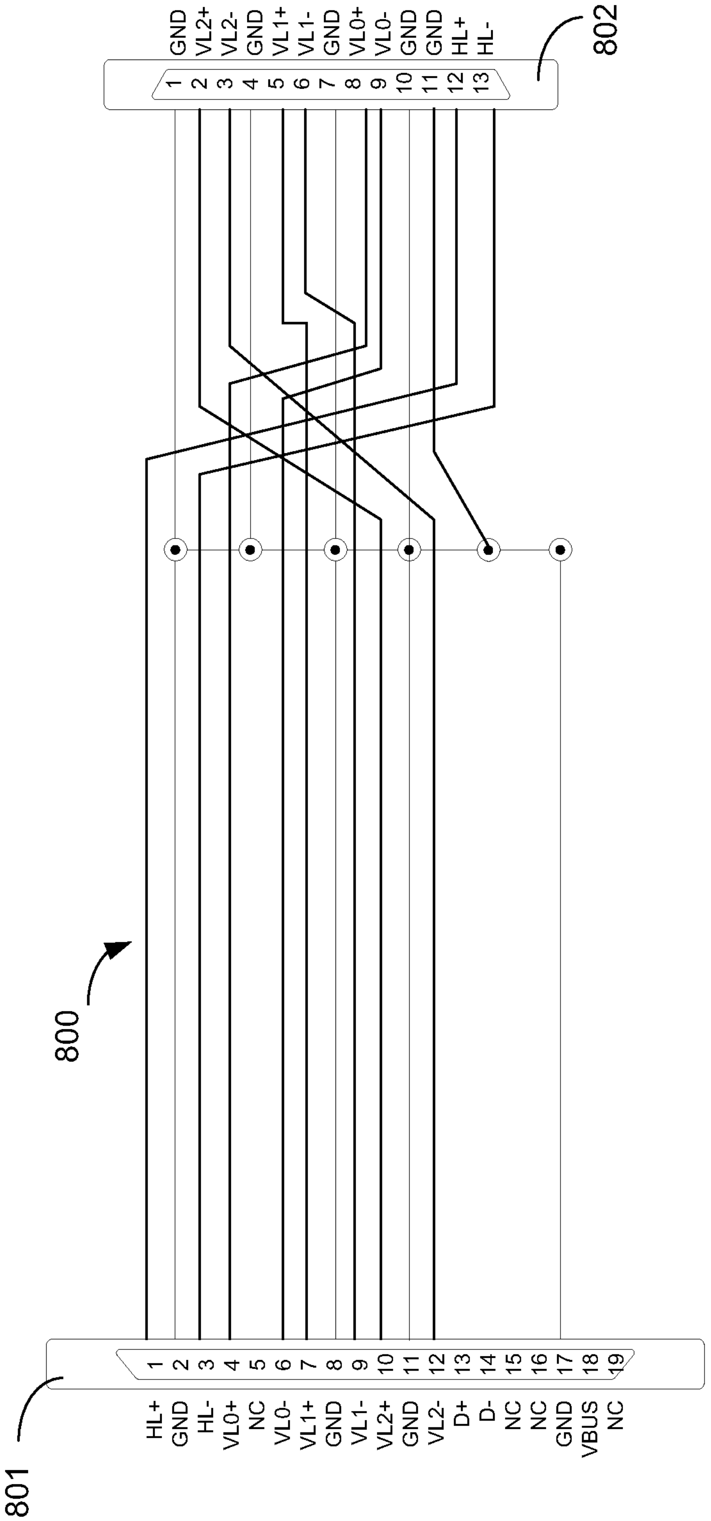
FIGS. 10A and 10B are schematic diagrams illustrating the wiring of different types of PoD cables connected to a DiiVA compliant host device and constructed according to certain embodiments of the invention.

The DiiVA PoD cable 800 comprises, at one end, a UNICONN connector, and at the other end, a DiiVA connector with 13 pins. The UNICONN connector includes either 19 or 16 pins, depending on the connector type. The wiring of the DiiVA PoD cable 800, according to one embodiment, with a UNICONN connector (801) including 19 pins is illustrated in FIG. 10A. For example, as shown in FIG. 10A, the lane pins (pin numbers 1, 3, 4, 6, 7, 9, 10, and 12) at the connector 801 are respectively wired to pins 12, 13, 8, 9, 5, 6, 2, and 3 at the DiiVA connector 802.

Figure 10B:
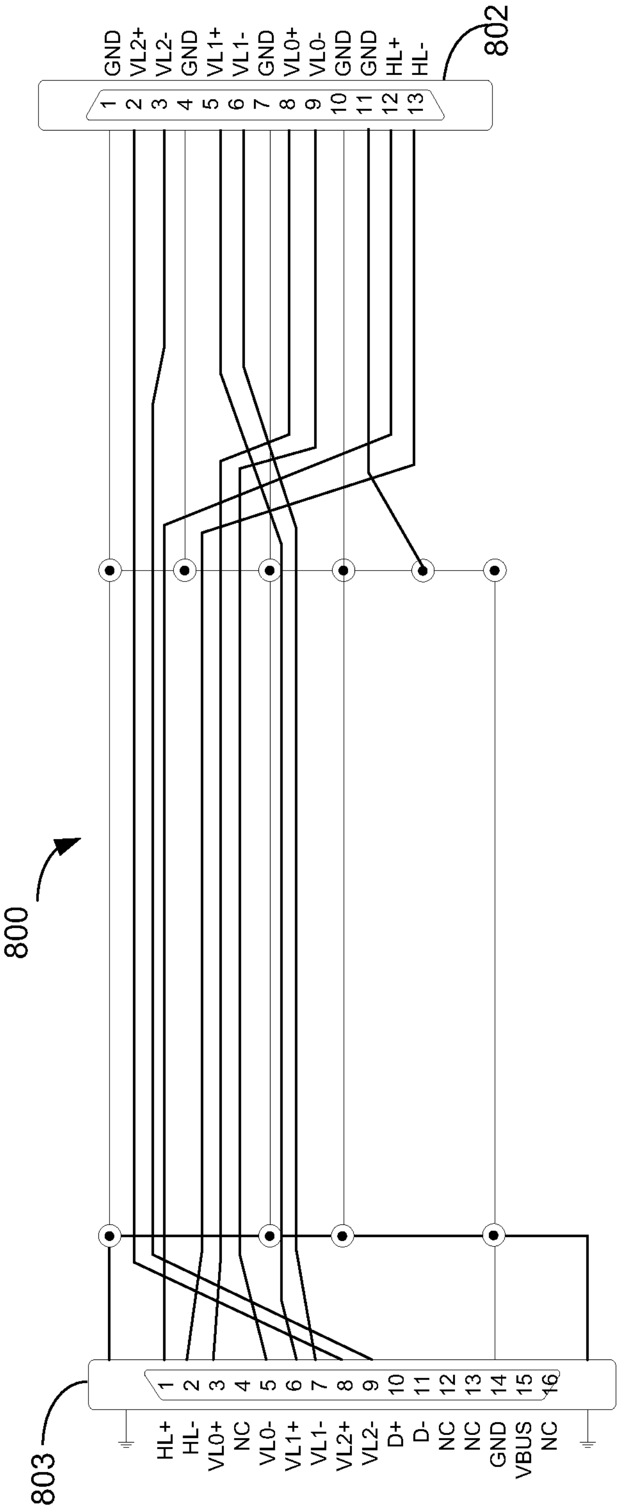

The wiring, according to another embodiment, of the streaming cable 800 with a UNICONN connector (803) including 16 pins is illustrated in FIG. 10B. For example, as shown in FIG. 10B, the lane pins (pin numbers 1, 2, 3, 5, 6, 7, 8 and 9) in the UNICONN connector 803 are respectively wired to pins 12, 13, 8, 9, 5, 6, 2, and 3 at the DiiVA connector 802. One of ordinary skill in the art recognizes that the pin assignments may be designed to be in any location based on design expediency.

Figure 11:
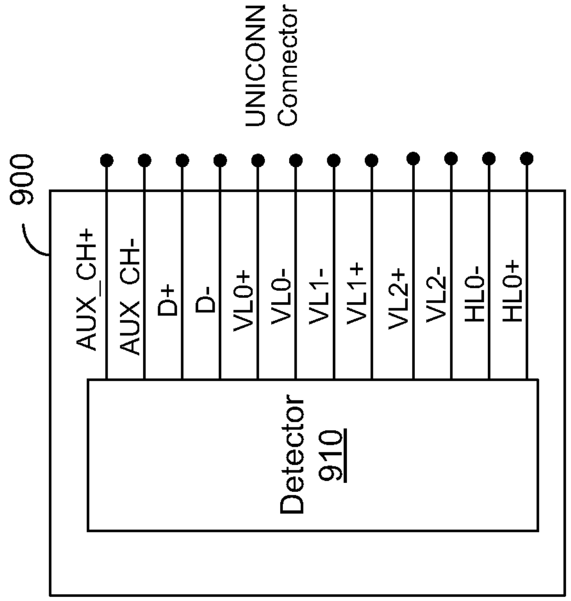
FIG. 11 is a schematic diagram of a multi-mode connectivity interface adapted to perform source recognition in accordance with an embodiment of the invention.

FIG. 11 shows an exemplary diagram illustrating the automatic recognition of a type of an interface connected to the multi-mode connectivity interface 900. In accordance with an embodiment, the interface 900 is installed in handheld devices equipped with a UNICONN connector (e.g., devices 120, 320, 520, and 720 and the interfaces 122, 322, 522, and 722 respectively).

Specifically, a detector 910 implements the sensing of an auxiliary channel using a logic circuit (not shown) that generates a decision regarding the type of a host device based on the logic values of the signals SDA/AUX_CHP and SLA/AUX_CHN (e.g., pins 15 and 16 in the 19-pin UNICONN connector; and pins 12 and 13 in the 16-pin UNICONN connector). Based on the logic values of the both SDA/AUX_CHP and SLA/AUX_CHN signals the type of the interface of a host device can be detected.

Specifically, if the logic value of SDA/AUX_CHP is '0' and the logic value of the SLA/AUX_CHN is '1', the host device includes a HDMI interface, and if the logic values of SDA/AUX_CHP and SLA/AUX_CHN are '1' and '0' respectively, the host device includes a DisplayPort device. Further, if the logic values of VL2± and the HL± (pins 10 and 12 and pins 1 and 3 in the UNICONN connector 701 and pins 8-9 and 1-2 in the connector 704 respectively) are '1', while the logic values of VL0± and VL1± is '0' (pins 4 and 6 and pins 7 and 9 in the connector 701 and pins 3 and 5 and 6-7 UNICONN connector 704 respectively), then the host device includes a DiiVA interface.

It should be noted that the indicated logic values of '1' and '0' and voltage values of the predefined threshold are only examples used for ease of understanding. One of ordinary skill in the art recognizes that the value may be designed to be any value based on design expediency.

It should be emphasized that the automatic recognition is required as the UNICONN connector is designed to support HDMI, DisplayPort, DiiVA and USB connectivity. As the handheld device with a UNICONN connector may be connected to any of these interfaces using the charging-streaming cables 100, 300, 500, 700, and 800 described above, the setting of the handheld device according to the type of the interface at the host device is needed.

Upon recognition of the type of a host device, the multi-mode connectivity interface 900 is set to be compliant with the interface type of the multimedia interface included in the host device. This includes, for example, setting analog circuits of an analog front-end of the interface 900 to a mode of operation compliant with the source device.

In accordance with an embodiment of the invention, the multi-mode connectivity interface 900 also senses the signal at the D+ and D− pins at the UNICONN connector (pin numbers 13 and 14 in the 19-pin UNICONN connector, and pin numbers 10 and 11 in the 16-pin UNICONN connector). This allows recognizing the speed mode and the port type of the USB interface connected at the other end of the cable. The speed mode may be one of: Low Speed, Full Speed, and High Speed. The mode of the USB interface is recognized as that defined in USB2 specification. If the speed mode is detected as High Speed, it is further checked to determine if the low frequency periodic signals (LFPS) are transmitted on the D+, D− wires. If so, it is determined that the other side operates at a USB3 mode, and the handheld device is activated accordingly.

While the present invention has been described at some length and with some particularity with respect to the several described embodiments, it is not intended that it should be limited to any such particulars or embodiments or any particular embodiment. Furthermore, the foregoing describes the invention in terms of embodiments foreseen by the inventor for which an enabling description was available, notwithstanding that insubstantial modifications of the invention, not presently foreseen, may nonetheless represent equivalents thereto. All examples and conditional language recited herein are intended for pedagogical purposes to aid the reader in understanding the principles of the invention and the concepts contributed by the inventors to furthering the art, and are to be construed as being without limitation to such specifically recited examples and conditions.

What is claimed is:

1. An apparatus for enabling simultaneous multimedia content streaming and power charging of handheld devices, comprising:

a universal connector installed in a first device and configured to enable connectivity of at least one multimedia display interface and at least one data interface with a second device, wherein the universal connector includes a plurality of contact pins and wherein the same plurality of contact pins serve different connectivity functions depending on a multimedia display interface type of the second device, the first device is connected to the second device using a charging-streaming cable having, at one end, a first connector compliant with the universal connector, and at the other end, a second connector compliant with a multimedia display interface and a third connector compliant with a data interface of the second device, wherein the second connector is any one of: a high-definition multimedia interface (HDMI) connector, a DisplayPort connector, and a digital interactive interface for video and audio (DiiVA) connector, and the third connector is at least a USB connector, and the third connector is at least a USB connector, wherein streaming of the multimedia content is from the universal connector in the first device to the second connector in the second device and power charging of the first device is through the third connector of the second device; and a detector for determining a type of the multimedia display interface of the second device from different types of a multimedia display interface, and setting the apparatus to process signals according to the determined multimedia display interface type, wherein the detector is further configured to sense an auxiliary channel of the multimedia display interface using a logic circuit for determining the type of the multimedia display interface, and upon determination of the type of the multimedia display interface, the detector is further configured to set a circuitry of the universal connector to a mode of operation being compliant with the first device.

2. The apparatus of claim 1, wherein the USB interface is at least any one of: a USB 2.0 type interface and a USB 1.0 type interface.

3. The apparatus of claim 1, wherein the first device is a handheld device and the second device is a host device.

4. The apparatus of claim 1, wherein the universal connector includes at least: a housing and a plurality of contact pins arranged in the housing, wherein a first group of contact pins of the plurality of contact pins serves different connectivity functions depending on the multimedia display interface type of the second connector and a second group pins of the plurality of contact pins allows the power charging of the first device.

5. The apparatus of claim 4, wherein the plurality of contact pins includes any arrangement of 19 pins and 16 pins.

6. The apparatus of claim 4, wherein different connectivity functions of the first group of the plurality of contact pins are of at least: a DisplayPort source, a DisplayPort sink, an HDMI interface, and a DiiVA interface.

7. The apparatus of claim 4, wherein the second connector is a DisplayPort connector, and the third connector is a USB connector of at least a USB 3.0 type interface.

8. The apparatus of claim 7, is further configured to allow data content streaming between the universal connector in the first device and the third connector in the second device.

9. An apparatus for enabling simultaneous multimedia content streaming and power charging of handheld devices, comprising:

a universal connector installed in a first device and configured for enabling connectivity of a multimedia display interface with a second device, wherein the universal connector includes a plurality of contact pins and wherein the same plurality of pins serve different connectivity functions depending on a multimedia display interface type of the second device, the first device is connected to the second device using a cable having, at one end, a first connector compliant with a universal connector and, at the other end, a second connector compliant with the multimedia display interface, wherein the second connector is any one of: a high-definition multimedia interface (HDMI) connector, a DisplayPort connector, and a digital interactive interface for video and audio (DiiVA) connector, wherein streaming of a multimedia content is from the universal connector in the first device to the second connector in the second device and power charging is from the second device to the first device through the cable, the universal connector includes a detector for determining a type of the multimedia display interface of the second device from different types of a multimedia display interface, and setting the apparatus to process signals according to the determined multimedia display interface type, the detector is further configured to sense an auxiliary channel of the multimedia display interface using a logic circuit for determining the type of the multimedia display interface and upon determination of the type of the multimedia display interface, the detector is further configured to set a circuitry of the universal connector to a mode of operation being compliant with the first device.

10. The apparatus of claim 9, wherein the second connector is a DiiVA connector.

11. The apparatus of claim 9, wherein the first device is a handheld device and the second device is a host device.

12. The apparatus of claim 9, wherein the universal connector includes at least: a housing and a plurality of contact pins arranged in the housing, wherein the plurality of contact pins include any arrangement of 19 pins and 16 pins.

13. An apparatus for enabling simultaneous data content streaming and power charging of handheld devices, comprising:

a universal connector installed in a first device and configured to enable connectivity of at least one data interface with a second device, wherein the universal connector includes a plurality of contact pins and wherein the same plurality of contact pins serve different connectivity functions depending on a multimedia display interface type of the second device and comprises a detector configured to determine a type of the multimedia display interface of the second device from different types of a multimedia display interface, and setting the apparatus to process signals according to determined multimedia display interface type, the detector is further configured to sense an auxiliary channel of the multimedia display interface using a logic circuit for determining the type of multimedia display interface, and upon determination of the type of the multimedia display interface, the detector is further configured to set a circuitry of the universal connector to a mode of operation being compliant with the first device, the first device is connected to the second device using a cable having, at one end, a first connector compliant with the universal connector and, at the other end, a second connector compliant with a data interface type, wherein streaming of the data content is from the universal connector in the first device to the second connector in the second device and from the second connector in the second device to the universal connector in the first device and power charging is from the second device to the first device through the cable.

14. The apparatus of claim 13, wherein the second connector is at least a USB connector.

15. The apparatus of claim 14, wherein the USB connector is of at least a USB interface including any one of: a USB 3.0 type interface, a USB 2.0 type interface, and a USB 1.0 type interface.

16. The apparatus of claim 13, wherein the first device is a handheld device and the second device is a host device.

17. The apparatus of claim 13, wherein the universal connector includes at least: a housing and a plurality of contact pins arranged in the housing, wherein the plurality of contact pins includes any arrangement of 19 pins and 16 pins.

18. A charging-streaming cable for enabling simultaneous multimedia content streaming and power charging of handheld devices, comprising:

a universal connector including a plurality of contact pins for providing connectivity for multimedia display interface signals and data interface signals, wherein the universal connector includes a plurality of pins and wherein the same plurality of pins serve different connectivity functions depending on a multimedia display interface type of the second connector and comprises a detector configured to determine a type of the multimedia display interface of the second device from different types of a multimedia display interface, and setting the apparatus to process signals according to the determined multimedia display interface type, the detector is further configured to sense an auxiliary channel of the multimedia display interface using a logic circuit for determining the type of the multimedia display interface, and upon determination of the type of the multimedia display interface, the detector is further configured to set a circuitry of the universal connector to a mode of operation being compliant with the first device;

a first multimedia connector including a plurality of contact pins providing connectivity for multimedia display interface signals for streaming of the multimedia content;

a second connector compliant with a data interface and including a plurality of contact pins providing connectivity power charging signals, wherein the universal connector is installed at one end of the cable, and the first and second connectors are installed at the other end of the cable, wherein the first connector is any one of: a HDMI connector, a DisplayPort connector, and a digital interactive interface for video & audio DiiVA connector, and the second connector is at least a USB connector: and a plurality of conducting wires for coupling a first group of the plurality of contact pins of the universal connector to the plurality of contact pins of the first connector to enable streaming of the multimedia content, and for coupling a second group of the plurality of contact pins of the universal connector to the plurality of contact pins of the second connector to enable power charging of a handheld device connected at the other end of the second connector.

19. The cable of claim 18, wherein the first connector and second connector are coupled to a host device.

20. The cable of claim 18, wherein the second connector is a USB connector of at least a USB 3.0 type interface.

21. The cable of claim 20, wherein the data content is streamed from the handheld device through the universal connector to the second connector.

22. The cable of claim 18, wherein the plurality of contact pins includes any arrangement of 19 pins and 16 pins.

* * * * *